Dec. 1, 1970   A. M. SLETTEN ET AL   3,544,843
HIGH-VOLTAGE DIRECT CURRENT CIRCUIT INTERRUPTER
Filed Dec. 19, 1967

WITNESSES:
Helen M. Farbas
James F. Young

INVENTORS
Andreas M. Sletten, Martin A. Uman,
Richard E. Orville & Anthony J. Venturino
BY
Willard R. Crout
ATTORNEY

United States Patent Office 3,544,843
Patented Dec. 1, 1970

---

3,544,843
HIGH-VOLTAGE DIRECT CURRENT CIRCUIT INTERRUPTER
Andreas M. Slettten and Martin A. Uman, Penn Hills, Richard E. Orville, Pittsburgh, and Anthony J. Venturino, Verona, Pa., assignors to Westinghouse Electric Corporation, Pittsburgh, Pa., a corporation of Pennsylvania
Filed Dec. 19, 1967, Ser. No. 691,760
Int. Cl. H02h 7/22
U.S. Cl. 317—11
2 Claims

ABSTRACT OF THE DISCLOSURE

A high-voltage direct-current circuit interrupter is provided by placing an exploding wire in electrical parallel with a circuit breaker. A second circuit breaker is disposed in series with the foregoing parallel arrangement. The sequence of operation is such that the sole series breaker opens first, drawing an arc between its electrodes and subsequently the parallel breaker opens. The arc voltage across the parallel breaker forces the DC current to flow through the exploding wire and the arc in the parallel breaker is extinguished. Subsequently the exploding wire creates a current zero which extinguishes the arc in the series breaker and allows the series breaker to deionize and thus recover a withstand voltage resulting in a permanent interruption of the current flow.

BACKGROUND OF THE INVENTION

In order to effect a circuit interruption it is necessary to create a current zero. In alternating-current circuits, current zeros occur regularly, and the technique of building alternating current circuit breakers is well established. For direct-current systems, it is though necessary to create an artificial current zero. As of now, there is, to our knowledge, no high-voltage direct-current circuit breaker in existence, but several proposals on how to create a current zero for direct-current circuit breakers have been made. These proposals normally utilize oscillatory circuits of capacitors, inductors and resistors to create a current zero, so that an arc in an interrupting medium is extinguished.

SUMMARY OF THE INVENTION

According to a preferred embodiment of the invention, there are provided two circuit breakers, one of which is electrically paralleled by an exploding wire. The arrangement is such that the non-paralleled circuit breaker opens first. Subsequently, the paralleled circuit breaker is opened, which forces the series direct current to flow through the exploding wire, which immediately vaporizes the wire. For a short time interval of, for example, 1.5 microseconds the current is reduced virtually to zero. This enables the arc in the series circuit breaker to extinguish and to withstand the returning voltage. The direct-current high-voltage circuit has thus been interrupted.

An object of the present invention is to provide a high-voltage direct-current circuit interrupter which will be particularly adapted for high-voltage circuits.

Another object of the present invention is the provision of a high-voltage direct-current circuit interrupter which utilizes a new phenomenon in connection with circuit-breaker interruption.

Still a further object of the present invention is the provision of a low-cost simplified-type of high-voltage direct-current circuit interrupter.

Further objects and advantages will readily become apparent upon reading the following specification, taken in conjunction with the drawings.

DESCRIPTION OF THE PREFERRED EMBODIMENT

In order to effect an arc interruption it is necessary to create a current zero. For direct-current systems, it is necessary to create an artificial current zero since normally the current does not go through zero. The following invention describes a method of achieving a current zero in connection with high-voltage direct-current circuit breakers. It is known that under certain conditions an exploding metallic wire may, for a short amount of time, become a relatively good insulator. In these cases, the following time sequence of events occurs: (1) Current flows through the wire and heats the wire. The wire is a good conductor during this period. (2) Due to the energy input, the wire melts and becomes for a short time a good insulator. Current is reduced at this time virtually to zero. (3) The metallic vapor cloud expands to the point that normal electronic conduction of the type exhibited by steady-state arcs is possible. The current now may again flow through a relatively small impedance.

In an exploding wire experiment using a high-voltage impulse generator, this same phenomenon was found to occur, i.e., after initial conduction, the current was reduced virtually to zero for a period of about 1.5 microseconds. A copper wire 12 feet in length and 4 mils in diameter was used. The voltage during the insulating period rose to approximately 2.5 million volts. The residual current cannot be determined from oscillograms with any accuracy, but does not exceed, we think, a few tens of amperes.

It is proposed to use this phenomenon to create an artificial current zero in a high-voltage direct-current circuit interrupter, and also in alternating-current circuits, where it may be desirable to create a current zero in addition to natural current zeros. Specifically, it is proposed to use an exploding wire to create a current zero in direct-current high-voltage circuit breakers.

Figure 1:
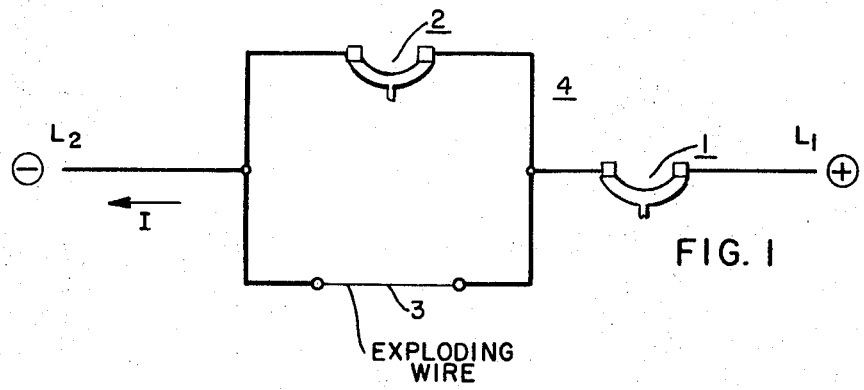
FIG. 1 is a diagrammatic view of the circuit breaker and exploding wire electrical arrangement.

With the foregoing description in mind, reference is directed to FIG. 1, which shows, generally, the location of the circuit breakers and the exploding wire in the direct-current high-voltage circuit interrupting arrangement. The operation is generally as follows: Breakers 1 and 2 are normally closed and carry the load current. When circuit interruption is desired, breaker 1 is opened and an arc is formed between its contacts. Breaker 2 is now opened and the current I should be diverted through the exploding wire 3 since it initially is a low resistance metallic conductor and breaker 2 develops an arc voltage forcing the current through the wire 3. Preferably, both circuit interrupters 1 and 2 develop interrupting ability to generate arc voltage. The duration of conduction through exploding wire 3 has to be long enough to permit the contacts of breaker 2 to be moved far enough apart for this gap to extinguish and develop sufficient withstand voltage. When wire 3 subsequently melts and forces a current zero, then the arc in breaker 1 has an opportunity to cool down and withstand the voltage appearing between its contacts when wire 3 again begins to conduct.

Capacitors paralleling breakers 1 and 2 would slow down the rate of rise of reappearing voltages and additional circuitry may also be desirable to shape or generate currents through wire 3 to attain optimum conditions. These parameters may readily be established, if desired, to result in the duration of initial conduction and duration of current zero of the exploding wire 3 being a function of currents, voltages, wire geometry and material as well as medium surrounding the exploding wire 3.

Figure 2:
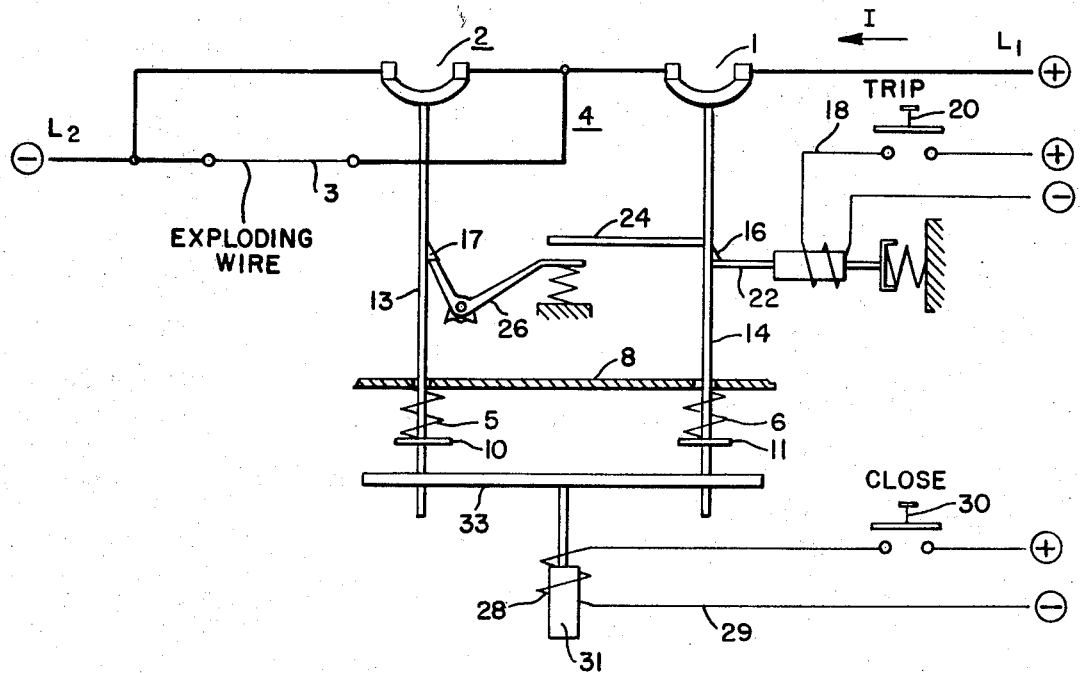
FIG. 2 illustrates structurally how the sequential operation of the circuit breakers is provided.

With regard to a structural arrangement for bringing into play the sequential operation, as described hereinbefore, attention may be directed to FIG. 2 of the drawings, which shows the two breakers 1 and 2 both biased toward the open-circuit position, as by means of biasing springs 5, 6 acting against a fixed abutment 8 and also against spring seats 10, 11 secured to and movable with the operating rods 13, 14 of the two breakers 1, 2. It will be noted that each of these breakers 1, 2 is latched by latching means 16, 17, and following energization of the trip circuit 18, by pressing the trip button 20, the first latch rod 22 is released permitting breaker 1 to open. An abutment 24, carried by the first breaker 1, mechanically actuates the latch 26 for the second breaker 2, so that the second breaker 2 opens after a certain time delay with respect to the first breaker 1.

For effecting the closing operation of both circuit breakers 1, 2, there is provided a closing solenoid 28 energized by a circuit 29 in series with a closing button 30. It will be observed that the armature 31 of the closing solenoid 28 carries an apertured reciprocally-movable actuating member 33, which engages the spring seats 10, 11 secured to, and movable with respect to the operating rods 13, 14. During the closing operation, the upward movement of the actuating member 33 effects closing operation of both circuit breakers 1, 2 in opposition to the contact compression springs 5, 6. The breakers 1, 2 will be latched in the closed-circuit position, and following deenergization of the closing circuit 29, the armature will be lowered by gravity to its inoperative position.

From the foregoing description it will be apparent that there has been provided a novel high-voltage direct-current circuit interrupted 4 comprising two breakers 1, 2, which utilizes a new phenomenon in connection with exploding-wire structure 3 as related to direct-current circuit-breaker application.

Although there has been illustrated and described specific structures, it is to be clearly understood that the same was merely for the purpose of illustration, and that changes and modifications may readily be made therein by those skilled in the art without departing from the spirit and scope of the invention.

We claim as our invention:

1. A direct-current circuit breaker including fusible means, separable contact means connected in electrically parallel arrangement with said fusible means, second separable contact means in series with the aforesaid parallel arrangement, and means for first opening said second separable contact means and subsequently said first-mentioned separable contact means at a time when both separable contact means are arcing to combine their interrupting effort.

2. The combination of claim 1, wherein both separable contact means are biased to the open-circuit position and unlatched in sequence.

References Cited

UNITED STATES PATENTS

| 1,294,621 | 2/1919 | Conrad | 317—11 X |
| 1,866,371 | 7/1932 | Prince | 317—11 |
| 3,249,810 | 5/1966 | Strom et al. | 317—11 |

JAMES D. TRAMMELL, Primary Examiner

U.S. Cl. X.R.
307—136; 317—54; 337—401